United States Patent [19]

Lincicome et al.

[11] 4,204,707
[45] May 27, 1980

[54] VIBRATION ABSORBING CONNECTOR

[75] Inventors: Thomas N. Lincicome, Elgin; John M. Spiro, Dundee; Albert J. Brons, Villa Park, all of Ill.

[73] Assignee: UOP Inc., Des Plaines, Ill.

[21] Appl. No.: 967,813

[22] Filed: Dec. 8, 1978

[51] Int. Cl.² ............................................. F16L 51/02
[52] U.S. Cl. .................................. 285/114; 285/226; 138/121; 138/139
[58] Field of Search .................... 285/114, 49, 226; 138/121, 139

[56] References Cited

U.S. PATENT DOCUMENTS

| | | | |
|---|---|---|---|
| 2,536,216 | 1/1951 | Powell | 285/114 X |
| 3,232,640 | 2/1966 | Donkle, Jr. | 285/114 X |
| 3,420,553 | 1/1969 | Poxon et al. | 285/49 |
| 3,532,131 | 10/1970 | Lefere | 285/49 X |
| 3,747,367 | 7/1973 | Muller | 285/226 X |
| 3,976,312 | 8/1976 | Murphree | 285/226 X |
| 4,147,185 | 4/1979 | Hines | 138/121 |

FOREIGN PATENT DOCUMENTS

| | | | |
|---|---|---|---|
| 1181508 | 11/1964 | Fed. Rep. of Germany | 285/114 |
| 759306 | 10/1956 | United Kingdom | 285/226 |
| 152598 | 3/1963 | U.S.S.R. | 114/ |

Primary Examiner—Thomas F. Callaghan
Attorney, Agent, or Firm—James R. Hoatson, Jr.; Barry L. Clark; William H. Page, II

[57] ABSTRACT

Vibration absorbing connector for use in high pressure fluid piping systems such as the refrigerant lines in an automotive air conditioning system incorporates a thin bellows member whose ends are restrained against axial movement by a restraining means such as a plurality of axially extending flexible cables or a braided metal sleeve which surrounds the bellows member. A molded-in-place elastomeric layer fills in the external bellows corrugations to prevent their deformation under load and encapsulates the restraining means. The design permits a 3 inch long bellows having a 0.005" wall thickness to perform as well as a 7 inch long bellows having a 0.020" wall which has a conventional configuration under internal fluid pressures that would collapse the thin wall bellows corrugations in the absence of the elastomeric layer.

2 Claims, 3 Drawing Figures

VIBRATION ABSORBING CONNECTOR

BACKGROUND OF THE INVENTION

Environmental concerns for preventing leakage of fluorocarbon refrigerants to the atmosphere from the reinforced, high pressure rubber tubing presently used in motor vehicle air conditioning units has led to a necessity that more leakproof materials, such as metal tubing, be used. Unfortunately, one cannot simply substitute a length of formed metal tubing for rubber in this situation since the engine mounted compressor undergoes a continuous and a rather substantial amount of movement due both to engine operation and vibrations relative to the frame mounted components such as the condenser and evaporator. For example, the typical resilient mounting of an engine on the vehicle frame allows about 0.500" of total movement. The movement would very quickly induce stresses in the metal tubing which would cause fatigue failure. It is conventional to absorb vibration and other movements of a metal piping system by means of a vibration connector assembly containing a metal bellows and such an assembly having rubber for sound and vibration damping over the crests of the corrugations and a metal braid reinforcement is disclosed in Poxon et al U.S. Pat. No. 3,420,553. Furthermore, it is known that the flexibility and the ability of such a connector to resist fatigue failure is related to the thickness of the wall of the bellows and its length. The greater the thickness, the longer the bellows must be to resist vibrations of a given deflection. Where internal operating pressures in the order of about 300 psi must be resisted, as is the case in refrigerant lines, the bellows wall thickness must not be so thin that its corrugations will collapse. For example, it has been determined that a 0.020' wall thickness and a corrugated bellows length of 7 inches is adequate where a lateral deflection of 0.25 inch per connector is to be expected. To accommodate the lateral relative movement between a pair of members which are spaced from each other, it is desirable to utilize a pair of connectors which are positioned in the piping system with their axes generally normal to each other since the connectors can move laterally but cannot move axially due to the restraint of the braided sleeve.

In addition to the aforementioned Poxon et al patent disclosing the use of rubber-like materials for bellows damping, several other patents disclose the molding of rubber-like materials into bellows corrugations. These include Panagrossi U.S. Pat. No. 2,685,459, Donkle, Jr. U.S. Pat. No. 3,232,640 and Swedish Pat. No. 132,558. In no instance is the rubber disclosed as being used to permit the bellows wall to be reduced in thickness and length to a point where the fluid pressures normally expected in the bellows would cause the destruction of the bellows if the rubber were not present.

SUMMARY

It is among the objects of the present invention to provide a vibration absorbing connector that will be small in size, light in weight, economical to produce and effective for its purpose.

The foregoing and other objects and advantages are attained by the connector of the present invention which incorporates a thin metal bellows member having uncorrugated end portions which are brazed to a pair of end plate members. The end plate members extend radially outwardly beyond the corrugations and are anchored to each other by restraining means such as a plurality of cables or a braided sleeve which surround the exterior of and prevent axial extension of the bellows member. The restraining members do, however, permit lateral movement of one end of the bellows member relative to the other. An additional, and very important, part of the connector assembly is a layer of molded elastomeric material which completely fills the external corrugations and extends radially outwardly thereof. The wall thickness of the bellows member is preferably too thin, standing alone, to resist design fluid pressure loads to which the connector is to be subjected without the corrugations being collapsed. The elastomeric material is preferably of a sufficient durometer to back-up and support the bellows corrugations against permanent deformation under design loads but not so high as to inhibit the ability of the connector to accommodate deflections of the bellows. For example, a two part rubber-like elastomer mixture of a B. F. Goodrich Company Hycar Liquid Polymer and Epoxy Resin having a durometer of about 50, Shore A, applied to the outer corrugations and restraints of a brass bellows having an I.D. of 0.625" and a 0.005" wall permitted a pair of prototype 3" long connectors arranged as they would be in a suction line assembly to withstand 1000 hours of vibration testing at 30 Hz and an axial displacement of one end of the assembly of 0.15". The test, which was equivalent to about 50,000 miles of use in a vehicle, showed no sign of deterioration of either the bellows or the elastomer. The suction line assembly was subjected to 50 psi internal pressure, the maximum it would experience during use.

DETAILED DESCRIPTION OF THE DRAWINGS

Figure 1:
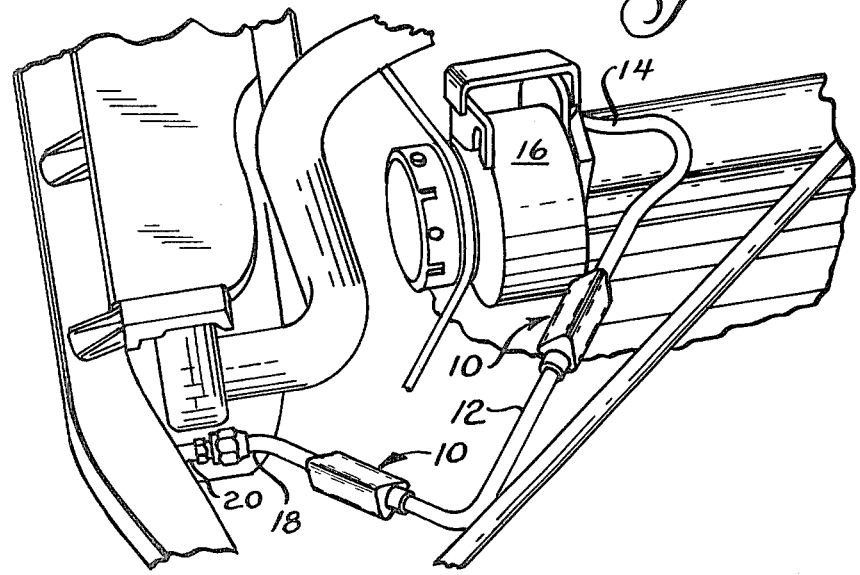
FIG. 1 is a fragmentary perspective view illustrating the use of the invention in a high pressure fluid piping system associated with an air conditioner system mounted on the engine of a vehicle.

FIG. 1 illustrates the use of the improved connector assembly indicated generally at 10 in a refrigerant discharge line 12 which is connected at one end 14 to an engine mounted compressor 16 and at its other end 18 to a frame mounted condenser inlet fitting 20 within the engine compartment of a vehicle. During operation of the engine upon which the compressor 16 is mounted, the compressor 16 and the end portion 14 of the line 12 can move approximately ½" in a plane transverse to the fitting portion 20 of the condenser. Since one end of a connector 10 can move laterally relative to its other end, as shown in dotted lines in FIG. 2, but cannot move axially, the connectors are mounted in pairs which are placed at right angles to each other in the metal tubing line 12. In order to provide maximum protection against fatigue failure of the line in which they are mounted, the connectors are preferably located within four diameters of one end of the line 12 or within four diameters of the starting point of a bend in the line where the line incorporates a bend as it does in FIG. 1. For example, if the end portion 18 of the line 12 were straight, the length ab should be not more than about four times the diameter of the tube 12. Likewise, the distance cd should be not more than about four times the diameter of the tubing 12.

As anyone knows who has ever attempted to work on an engine of a motor vehicle, the space available for access to the various structural elements is usually extremely limited. Accordingly, it is highly desirable that the line 12 and its associated connectors 10 consume little if any more space than was utilized in the past by flexible rubber hoses. It is also common knowledge that vehicle manufacturers strive to produce their vehicles as economically as possible consistent with satisfactory performance and a satisfactory life. The connector 10 is considerably more compact than existing bellows type connectors and also is quite economical since it utilizes relatively little material in its construction.

Figure 2:
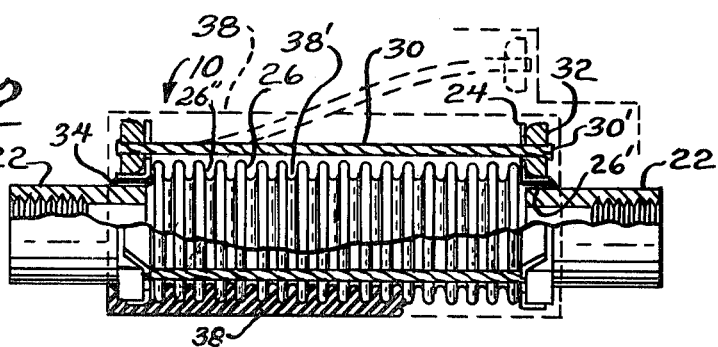
FIG. 2 is a partially sectioned and partially broken away view of the improved connector.
Figure 3:
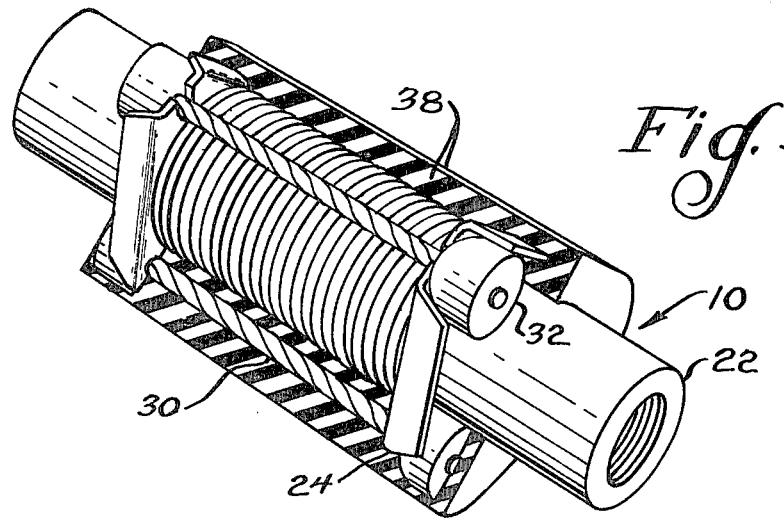
FIG. 3 is a partially sectioned and partially broken away perspective view of the improved connector.

The connector 12 is illustrated in considerable detail in FIG. 2. A pair of metal end fittings 22 permit the connector to be inserted in a metal tubing line 12. The fittings 22 are shown as being threaded but could obviously be attached to the tube 12 in other fashions. For example, they could be attached by induction brazing. The principal portion of the connector 10 is the thin corrugated bellows member 26 which has straight uncorrugated end portions 26' which may overlie end fittings 22 and be induction brazed thereto. Axial extension of the corrugated bellows member 26 and its corrugations 26'' is prevented by a pair of end plate members 24 which are brazed to the bellows end portions 26' and the fittings 22. A retaining or tie means such as a plurality of woven wire cables 30, prevents the axial movement of the end plates 24 away from each other. The cables 30 are shown as being mounted in retaining buttons 32 which are captured by the end plates 24. The cables 30 are retained in the buttons 32 by enlarged end portions 30'. A layer of molded elastomeric material 38 is molded in contact with the connector so as to completely fill all of the outwardly facing corrugations 26''. Preferably, the material 38 extends radially outwardly beyond the cables 30 to retain the cables and better insure that the bellows section 26 will not force its way out between two cables when it is laterally deflected. Where the retaining means is a braid, or where more than three cables 30 are utilized, the material 38 would not have to extend beyond the retaining means although it might be desirable for esthetic reasons or to provide protection from corrosion or physical abuse to the encapsulated elements.

For automotive use, the connector 10 should be capable of withstanding temperatures in the range of −50° F. to 260° F. and pressures up to about 600 psi. We have found that for such use the elastomeric material 38 must be neither too soft so that the profile of the corrugations 26'' will be deformed nor too hard so that the connector will not have the requisite flexability to absorb vibrations. Hardnesses below about 40 durometer, Shore A are probably too low and hardnesses higher than 80 or 90 are probably too high. We have found good results at about 50 durometer, Shore A and believe that hardnesses in the range of about 40–70 should be satisfactory. If a dual or variable hardness elastomer is used, it would be preferable to have a durometer of about 70 in the roots of the corrugations and 40 in the outer regions.

The bellows member 26 may be made of a conventional configuration and of metals such as brass, stainless steel, or beryllium copper which are commonly used in bellows construction.

We claim as our invention:

1. A connector for isolating high pressure fluid piping systems from vibration comprising a corrugated thin metal bellows member having a central corrugated section of a wall thickness no greater than about 0.006" and of an insufficient thickness if subjected to system maximum design pressures to resist permanent deformation, and integral opposed uncorrugated end portions adapted to be attached to spaced portions of an associated piping system; a pair of end plate members, each of said end plate members having a central aperture therein through which one of said end portions passes and an annular planar surface positioned in a plane perpendicular to the axis of the bellows member, said planar surfaces contacting the axially outermost corrugations in said central corrugated section and being integrally affixed to said uncorrugated end portions; tie means anchored to each of said end plate members at least three circumferentially spaced points for resisting axial separation of said end plate members and axial elongation of said central corrugated section while permitting lateral movement of the spaced portions of the associated piping system relative to each other, integral elastomeric means surrounding said connector and encapsulating said tie means, said elastomeric means including at least a first elastomeric portion of a durometer in the range of about 40–70, Shore A filling the spaces between the outward facing corrugations in the central corrugated section, said elastomeric portion having sufficient rigidity to limit deformation of the corrugations under operating conditions to an amount which will not degrade their ability to continue to absorb vibratory motions.

2. The connector of claim 1 wherein said tie means comprise at least three cables.

* * * * *